(12) United States Patent
Poeselt et al.

(10) Patent No.: US 11,168,175 B2
(45) Date of Patent: Nov. 9, 2021

(54) TPU PNEUMATIC TUBES MADE WITH MONO ETHYLENEGLYCOL AS CHAIN EXTENDER FOR HIGH TEMPERATURE USE

(71) Applicant: BASF SE, Ludwigshafen am Rhein (DE)

(72) Inventors: Elmar Poeselt, Hamburg (DE); Dirk Kempfert, Stemwede-Dielingen (DE)

(73) Assignee: BASF SE, Ludwigshafen am Rhein (DE)

( * ) Notice: Subject to any disclaimer, the term of this patent is extended or adjusted under 35 U.S.C. 154(b) by 62 days.

(21) Appl. No.: 15/763,146

(22) PCT Filed: Sep. 20, 2016

(86) PCT No.: PCT/EP2016/072258
§ 371 (c)(1),
(2) Date: Mar. 26, 2018

(87) PCT Pub. No.: WO2017/050738
PCT Pub. Date: Mar. 30, 2017

(65) Prior Publication Data
US 2018/0265621 A1 Sep. 20, 2018

(30) Foreign Application Priority Data

Sep. 24, 2015 (EP) ..................... 15186636

(51) Int. Cl.
| | |
|---|---|
| *C08G 18/66* | (2006.01) |
| *C08G 18/48* | (2006.01) |
| *C08G 18/76* | (2006.01) |
| *C08G 18/08* | (2006.01) |
| *C08G 18/24* | (2006.01) |
| *C08G 18/32* | (2006.01) |
| *C08G 18/42* | (2006.01) |
| *C08J 5/18* | (2006.01) |
| *F16L 11/04* | (2006.01) |

(52) U.S. Cl.
CPC ..... *C08G 18/4854* (2013.01); *C08G 18/0895* (2013.01); *C08G 18/244* (2013.01); *C08G 18/3206* (2013.01); *C08G 18/4238* (2013.01); *C08G 18/664* (2013.01); *C08G 18/6674* (2013.01); *C08G 18/6681* (2013.01); *C08G 18/7671* (2013.01); *C08J 5/18* (2013.01); *F16L 11/04* (2013.01); *C08J 2375/04* (2013.01)

(58) Field of Classification Search
CPC ............ C08G 18/6681; C08G 18/3206; C08G 18/4854; C08G 18/0895
See application file for complete search history.

(56) References Cited

U.S. PATENT DOCUMENTS

| | | |
|---|---|---|
| 5,959,059 A | 9/1999 | Vedula et al. |
| 6,197,915 B1 * | 3/2001 | Yamana ............. C08G 18/0895 264/176.1 |
| 6,319,985 B1 | 11/2001 | Brüning et al. |
| 6,559,229 B1 | 5/2003 | Brüning et al. |
| 2007/0265413 A1 | 11/2007 | Peerlings et al. |
| 2008/0139776 A1 | 6/2008 | Scholz et al. |
| 2009/0100723 A1 | 4/2009 | Farkas et al. |
| 2009/0149622 A1 * | 6/2009 | Sonnenschein ........ C08G 18/10 528/66 |
| 2013/0267639 A1 * | 10/2013 | Zhuang ................... C08L 75/04 524/285 |
| 2015/0246994 A1 | 9/2015 | Moore et al. |
| 2016/0244587 A1 * | 8/2016 | Gutmann et al. .......... C08J 9/34 |
| 2016/0257775 A1 * | 9/2016 | Koike ........................ C08J 5/18 |
| 2016/0260516 A1 * | 9/2016 | Schaefer et al. ......... H01B 1/20 |
| 2016/0340465 A1 * | 11/2016 | Desbois et al. ....... C08G 18/833 |
| 2017/0173854 A1 * | 6/2017 | Bokern et al. ........ B29C 61/003 |
| 2017/0233520 A1 * | 8/2017 | Poeselt et al. ..... C08G 18/7671 |
| 2018/0086871 A1 * | 3/2018 | Bokern et al. ..... C08G 18/3215 |

FOREIGN PATENT DOCUMENTS

| | | |
|---|---|---|
| DE | 10 2005 004 967 A1 | 8/2006 |
| DE | 10 2006 021 734 A1 | 11/2007 |
| EP | 0 922 552 A1 | 6/1999 |
| EP | 0 959 104 A1 | 11/1999 |
| JP | 2003089985 A * | 3/2003 |
| WO | WO 98/56845 A1 | 12/1998 |
| WO | WO 2006/082183 A1 | 8/2006 |
| WO | WO-2015056763 A1 * | 4/2015 ......... C08G 18/4858 |

OTHER PUBLICATIONS

Michael Szycher. Jul. 13, 2012, Structure-Property Relations in Polyurethanes from: Szycher's Handbook of Polyurethanes CRC Press.*
JP-2003089985_03-2003_Watanabe et al. English Translation.*
Verlag, C.H., "Polyurethane", Kunststoff-Handbuch VII, Band 7, Auflage, Kapitel 3.1, 1993, pp. 96-120 with cover pages.
Verlag, C.H., Kunststoffhandbuch, Band VII, herausgegeben von Vieweg und Höchtlen, 1966, pp. 57-75.

* cited by examiner

*Primary Examiner* — Michael L Leonard
(74) *Attorney, Agent, or Firm* — Grüneberg and Myers PLLC

(57) ABSTRACT

The present invention relates to a thermoplastic polyurethane obtainable or obtained by the conversion of at least a polyisocyanate composition, ethane-1,2-diol as chain extender and a polyol composition, wherein no further chain extender is used aside from ethane-1,2-diol, to a process for preparing such a thermoplastic polyurethane, and to the use of such a polyurethane for production of injection molded products, extrusion products, films and shaped bodies.

16 Claims, No Drawings

TPU PNEUMATIC TUBES MADE WITH MONO ETHYLENEGLYCOL AS CHAIN EXTENDER FOR HIGH TEMPERATURE USE

This application is a National Stage of PCT/EP2016/072258, which was filed on Sep. 20, 2016. This application is based upon and claims the benefit of priority to European Application No. 15186636.5, which was filed on Sep. 24, 2015.

The present invention relates to a thermoplastic polyurethane obtainable or obtained by conversion of at least a polyisocyanate composition, ethane-1,2-diol as chain extender and a polyol composition, wherein no further chain extender is used aside from ethane-1,2-diol. In one embodiment, the present invention relates to a thermoplastic polyurethane obtainable or obtained by conversion of at least a polyisocyanate composition, ethane-1,2-diol as chain extender and a polyol composition, wherein the polyol composition comprises at least polytetrahydrofuran (PTHF) and the polyisocyanate composition comprises at least methylene diphenyl diisocyanate (MDI). The present invention further relates to a process for preparing such thermoplastic polyurethanes, and to the use of such polyurethanes for production of injection molded products, extrusion products, films and shaped bodies.

Thermoplastic polyurethanes for various applications are known in principle from the prior art. By the variation of the feedstocks, it is possible to obtain different profiles of properties.

For example, WO 2006/082183 A1 discloses a process for continuously preparing thermoplastically processible polyurethane elastomers, in which a polyisocyanate, a compound having Zerevitinoff-active hydrogen atoms with a mean molecular weight of 450 g/mol to 5000 g/mol, a chain extender and further auxiliaries and additives are converted. This achieves specific profiles of properties via specific processing.

EP 0 922 552 A1 also discloses a process for continuously producing pellets from thermoplastic polyurethane elastomers, wherein a pelletized material is first produced by reaction of organic diisocyanates, difunctional polyhydroxyl compounds having molecular weights of 500 to 8000 and difunctional chain extenders having molecular weights of 60 to 400 in the presence of catalysts and optionally auxiliaries and/or additives. Use for production of extruded, injection molded or calendered material, especially of cable sheathing, hoses and/or films, is likewise disclosed.

EP 0 959 104 A1 discloses mixtures comprising a thermoplastic polyurethane having a Shore hardness of 60 A to 50 D and ethylene-propylene (EPM) rubbers and/or modified ethylene-propylene (EPM) rubbers, which are likewise used for production of hoses.

WO 98/56845 discloses a thermoplastic polymer which is obtained by reaction of a polyisocyanate, a glycol as chain extender and a polyether polyol. Various isocyanates, chain extenders and polyols are disclosed.

Depending on the type of application, the properties of the thermoplastic polyurethane can be varied via the type of feedstocks and the quantitative ratios used. For example, for use as a hose material, especially for pneumatic hoses, a high burst pressure even at elevated temperatures is necessary. It is possible to influence stability by variation of the polyol component for example. It is also possible to influence stability via the processing, for example by heat treatment. In addition, existing ester variants that exhibit a burst pressure at 70° C. of greater than 20 bar are opaque to translucent and hence unsuitable for many applications.

For various applications, for example for use as cable sheathing, a high heat distortion resistance of the thermoplastic polyurethane used is additionally advantageous. One example of a measure of heat distortion resistance is the onset temperature, determined by means of TMA. For many applications, a high instantaneous heat distortion resistance is advantageous.

Proceeding from the prior art, it was accordingly an object of the present invention to provide improved materials which, even at elevated temperatures, exhibit a good burst pressure when used for production of hoses. It was a further object of the present invention to provide materials having high heat distortion resistance, in particular high instantaneous heat distortion resistance.

According to the invention, this object is achieved by a thermoplastic polyurethane obtainable or obtained by conversion of at least components (i) to (iii):
 (i) a polyisocyanate composition;
 (ii) ethane-1,2-diol as chain extender;
 (iii) a polyol composition,
wherein no further chain extender is used aside from ethane-1,2-diol.

The invention also relates to a thermoplastic polyurethane obtainable or obtained by conversion of at least components (i) to (iii):
 (i) a polyisocyanate composition;
 (ii) ethane-1,2-diol as chain extender;
 (iii) a polyol composition,
wherein the polyol composition comprises at least polytetrahydrofuran (PTHF), and the polyisocyanate composition comprises at least methylene diphenyl diisocyanate (MDI) and wherein no further chain extender is used aside from ethane-1,2-diol.

It has been found that, surprisingly, through the use of ethane-1,2-diol as the sole chain extender, especially in combination with a defined polyisocyanate composition and a defined polyol composition, a thermoplastic polyurethane having good burst pressure characteristics and high heat distortion resistance is obtained. It has been found that, surprisingly, through the use of ethane-1,2-diol as chain extender, particularly in combination with the defined polyisocyanate composition and the polyol composition, it was possible to produce a hose which, at 70° C., has a burst pressure of greater than 20 bar. Furthermore, the hoses exhibit essentially localized bursting characteristics. Preferably, the thermoplastic polyurethanes obtained also have good creep characteristics.

According to the invention, the thermoplastic polyurethane is obtained or obtainable by conversion of components (i) to (iii). This involves converting a polyisocyanate composition, a polyol composition and ethane-1,2-diol as chain extender. According to the invention, no further chain extender is used aside from ethane-1,2-diol.

In a further embodiment, a polyisocyanate composition comprising at least methylene diphenyl diisocyanate (MDI), a polyol composition comprising at least polytetrahydrofuran (PTHF), and ethane-1,2-diol as chain extender are converted.

In the context of the present invention, the polyol composition used comprises at least one polyol.

Polyols are known in principle to those skilled in the art and are described, for example, in "Kunststoffhandbuch, Band 7, Polyurethane" [Plastics Handbook, Volume 7, Polyurethanes], Carl Hanser Verlag, 3rd edition 1993, chapter 3.1. Particular preference is given to using polyesterols or polyetherols as polyols. It is likewise possible to use polycarbonates. Copolymers may also be used in the context of the present invention.

The number-average molecular weight of the polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

Polyethers, for example polytetrahydrofuran, are suitable in accordance with the invention, but also polyesters, block copolymers and hybrid polyols, for example poly(ester/amide). Preferred polyetherols in accordance with the invention are polyethylene glycols, polypropylene glycols, polyadipates, polycarbonate(diol)s and polycaprolactone.

For example, the polyol composition comprises at least one polytetrahydrofuran. In a further embodiment, the present invention accordingly relates to a thermoplastic polyurethane as described above, wherein the polyol composition used comprises at least one polytetrahydrofuran.

In a particularly preferred embodiment, the polyol used has a molecular weight Mn in the range from 500 g/mol to 1500 g/mol, preferably in the range from 600 g/mol to 1400 g/mol, more preferably in the range from 650 g/mol to 1000 g/mol.

The present invention accordingly relates, in a further embodiment, to a thermoplastic polyurethane as described above, wherein at least one polyol present in the polyol composition has a molecular weight Mn in the range from 500 g/mol to 1500 g/mol.

It is also possible to use polyester polyols in the context of the present invention, preferably polyesters having a molecular weight Mn in the range from 500 g/mol to 2500 g/mol, further preferably in the range from 550 g/mol to 1800 g/mol, more preferably in the range from 600 g/mol to 1200 g/mol.

According to the invention, it is also possible to use mixtures of different polyols. The polyol composition may also comprise two or more polyols. Preferably, the polyols used and the polyol composition have a mean functionality between 1.8 and 2.3, preferably between 1.9 and 2.2, especially 2. Preferably, the polyols used in accordance with the invention have only primary hydroxyl groups.

In one embodiment of the present invention, for preparation of the thermoplastic polyurethane, at least one polyol composition comprising at least polytetrahydrofuran is used as component (iii). According to the invention, the polyol composition may also comprise further polyols as well as polytetrahydrofuran.

According to the invention, for example, further polyethers are suitable, but also polyesters, block copolymers and hybrid polyols, for example poly(ester/amide). Preferred polyetherols in accordance with the invention are polyethylene glycols, polypropylene glycols and polycaprolactone.

In a further embodiment, the present invention relates to a thermoplastic polyurethane as described above, wherein the polyol composition used comprises at least one polytetrahydrofuran and comprises at least one polyol selected from the group consisting of polyethylene glycol, polypropylene glycol, polyadipates, polycarbonate(diol)s and polycaprolactones.

In a further embodiment, the present invention further relates to a thermoplastic polyurethane as described above, wherein the polyol composition comprises at least one polytetrahydrofuran and at least one further polyol selected from the group consisting of polyethylene glycol, polypropylene glycol and polycaprolactone.

In the context of the present invention, composition of the polyol composition may vary within wide ranges. For example, the content of polytetrahydrofuran may be in the range from 15% to 85%, preferably in the range from 20% to 80%, further preferably in the range from 25% to 75%.

According to the invention, the polyol composition may also comprise a solvent. Suitable solvents are known per se to those skilled in the art.

If polytetrahydrofuran is used, the molecular weight Mn of the polytetrahydrofuran is preferably in the range from 650 to 1400 g/mol. Further preferably, the molecular weight Mn of the polytetrahydrofuran is in the range from 750 to 1400 g/mol.

In a further embodiment, the present invention relates to a thermoplastic polyurethane as described above, wherein the polytetrahydrofuran has a molecular weight Mn in the range from 650 g/mol to 1400 g/mol.

Especially in the case of use of a polytetrahydrofuran having a molecular weight Mn in the range from 650 g/mol to 1400 g/mol, good material properties and/or a good profile of properties for use as a pneumatic hose are obtained.

In a further embodiment, the present invention relates to a thermoplastic polyurethane as described above, wherein the polyol composition used is free of polytetrahydrofuran (PTHF) and no polytetrahydrofuran (PTHF) is used as further component in the conversion. For example, the present invention relates to a thermoplastic polyurethane as described above, wherein no further chain extender is used aside from ethane-1,2-diol, the polyol composition used is free of polytetrahydrofuran (PTHF) and no polytetrahydrofuran (PTHF) is used as further component in the conversion.

According to the invention, ethane-1,2-diol is used as chain extender and no further chain extender is used. In the context of the present invention, a chain extender is understood to mean a compounds having at least two functional groups reactive toward isocyanates, for example hydroxyl groups, amino groups or thiol groups, and a molecular weight Mw of less than 300 g/mol. At the same time, in the context of the present invention, the polyol composition is also free of compounds of this kind.

In the context of the present invention, the amount of the chain extender and of the polyol composition used may vary within wide ranges. For example, component (iii) and component (ii) are used in a molar ratio of (iii):(ii) of 1:0.7, 1:2.7 and 1:7.3.

According to the invention, a polyisocyanate composition is used for preparation of the thermoplastic polyurethane. The polyisocyanate composition comprises at least one polyisocyanate. According to the invention, the polyisocyanate composition may also comprise two or more polyisocyanates. For example, in the context of the present invention, a polyisocyanate composition comprising at least methylene diphenyl diisocyanate (MDI) is used for preparation of the thermoplastic polyurethane.

According to the invention, the term "methylene diphenyl diisocyanate" is understood to mean diphenylmethane 2,2'-, 2,4'- and/or 4,4'-diisocyanate or a mixture of two or three isomers. It is thus possible in accordance with the invention to use diphenylmethane 2,2'-, 2,4'- and/or 4,4'-diisocyanate or a mixture of two or three isomers. According to the invention, the polyisocyanate composition may also comprise further polyisocyanates. According to the invention, it is thus also possible that the isocyanate composition comprises methylene diphenyl diisocyanate and at least one further polyisocyanate. According to the invention, however, it is also possible that the isocyanate composition comprises methylene phenyl diisocyanate only.

According to the invention, it is also possible to use a polyisocyanate composition comprising no methylene diphenyl diisocyanate (MDI) for preparation of the thermoplastic polyurethane.

Accordingly, the present invention relates, in a further embodiment, to a thermoplastic polyurethane as described above, wherein the polyisocyanate composition used is free of methylene diphenyl diisocyanate (MDI). In this case, if the polyisocyanate composition used is free of methylene diphenyl diisocyanate (MDI), preferably no methylene diphenyl diisocyanate (MDI) is used as a further component in the conversion.

Preferred polyisocyanates in the context of the present invention are diisocyanates, especially aliphatic or aromatic diisocyanates, further preferably aromatic diisocyanates.

In addition, in the context of the present invention, it is possible to use prereacted prepolymers as isocyanate components, in which some of the OH components have been reacted with an isocyanate in a preceding reaction step. These prepolymers are reacted with the remaining OH components in a subsequent step, the actual polymer reaction, and then form the thermoplastic polyurethane. The use of prepolymers offers the option of using OH components having secondary alcohol groups as well.

Aliphatic diisocyanates used are standard aliphatic and/or cycloaliphatic diisocyanates, for example tri-, tetra-, penta-, hexa-, hepta- and/or octamethylene diisocyanate, methylpenta-methylene 1,5-diisocyanate, 2-ethyltetramethylene 1,4-diisocyanate, 2-hexamethylene 1,6-diisocyanate (HDI), pentamethylene 1,5-diisocyanate, butylene 1,4-diisocyanate, trimethylhexa-methylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, 4,4'-, 2,4'- and/or 2,2'-methylene dicyclohexyl diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylene dicyclohexyl diisocyanate (H12MDI).

Preferred aliphatic diisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylene dicyclohexyl diisocyanate (H12MDI); especially preferred are 4,4'-, 2,4'- and/or 2,2'-methylene dicyclohexyl diisocyanate (H12MDI) and 1-isocyanato-3,3,5-trimethyl-5-isocyanatomethyl-cyclohexane or mixtures thereof.

In a further embodiment, the present invention relates to a thermoplastic polyurethane as described above, wherein the polyisocyanate composition used comprises at least one polyisocyanate selected from the group consisting of methylene diphenyl diisocyanate (MDI), hexamethylene 1,6-diisocyanate (HDI) and 4,4'-, 2,4'- and 2,2'-methylene dicyclohexyl diisocyanate (H12MDI). More preferably, the polyisocyanate composition used comprises methylene diphenyl diisocyanate (MDI) as polyisocyanate.

Suitable aromatic diisocyanates are especially naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Preferred examples of higher-functionality isocyanates are triisocyanates, e.g. triphenylmethane 4,4',4"-triisocyanate, and additionally the cyanurates of the aforementioned diisocyanates, and also the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

According to the invention, the polyisocyanate composition may also comprise one or more solvents. Suitable solvents are known to those skilled in the art. Suitable examples are nonreactive solvents such as ethyl acetate, methyl ethyl ketone and hydrocarbons.

It is further possible in the context of the present invention to use crosslinkers as well, for example the aforementioned higher-functionality polyisocyanates or polyols or else other higher-functionality molecules having two or more functional groups reactive toward isocyanates.

According to the invention, components (i) to (iii) are used in such a ratio that the molar ratio of the sum total of the functionalities of the polyol composition and chain extenders used to the sum total of the functionalities of the isocyanate composition used is in the range from 1:0.8 to 1:1.3. The ratio is preferably in the range from 1:0.9 to 1:1.2, further preferably in the range from 1:0.965 to 1:1.05, more preferably in the range from 1:0.98 to 1.1.03.

In a further embodiment, the present invention relates to a thermoplastic polyurethane as described above, wherein the molar ratio of the sum total of the functionalities of the polyol composition and chain extenders used to the sum total of the functionalities of isocyanate composition used is in the range from 1:0.8 to 1:1.3.

A further parameter which is taken into account in the conversion of components (i) to (iii) is the isocyanate index. The index is defined here as the ratio of the total for number of isocyanate groups of component (i) used in the reaction to the isocyanate-reactive groups, i.e., more particularly, the groups of components (ii) and (iii). At an index of 1000, there is one active hydrogen atom per isocyanate group of component (i). At indices exceeding 1000, there are more isocyanate groups than isocyanate-reactive groups. Preferably, the index in the conversion of components (i) to (iii) is in the range from 965 to 1100, for example in the range from 970 to 1100, further preferably in the range from 970 to 1050, more preferably in the range from 980 to 1030.

In a further embodiment, the present invention relates to a thermoplastic polyurethane as described above, wherein the index in the conversion is in the range from 965 to 1100.

According to the invention, in the conversion of components (i) to (iii), it is possible to add further additives, for example catalysts or auxiliaries and additions. Additions and auxiliaries are known per se to those skilled in the art. According to the invention, it is also possible to use combinations of two or more additives.

In the context of the present invention, the term "additive" is especially understood to mean catalysts, auxiliaries and additions, especially stabilizers, nucleating agents, fillers or crosslinkers.

Suitable additives/additions are, for example, stabilizers, nucleating agents, fillers, for example silicates, or crosslinkers, for example polyfunctional aluminosilicates.

In a further embodiment, the present invention accordingly relates to a thermoplastic polyurethane as described above, wherein the thermoplastic polyurethane comprises at least one additive.

Examples of auxiliaries and additions include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additions can be found, for example, in the Kunststoffhandbuch, volume VII, edited by Vieweg and Höchtlen, Carl Hanser Verlag, Munich 1966 (p. 103-113).

Suitable catalysts are likewise known in principle from the prior art. Suitable catalysts are, for example, organic metal compounds selected from the group consisting of tin organyls, titanium organyls, zirconium organyls, hafnium organyls, bismuth organyls, zinc organyls, aluminum organyls and iron organyls, for example tin organyl compounds, preferably tin dialkyls such as dimethyltin or diethyltin, or tin organyl compounds of aliphatic carboxylic acids, preferably tin diacetate, tin dilaurate, dibutyltin diacetate, dibutyltin dilaurate, bismuth compounds such as bismuth alkyl compounds or the like, or iron compounds, preferably iron(MI) acetylacetonate, or the metal salts of the carboxylic acids, for example tin(II) isooctoate, tin dioctoate, titanic esters or bismuth(III) neodecanoate.

In a preferred embodiment, the catalysts are selected from tin compounds and bismuth compounds, further preferably tin alkyl compounds or bismuth alkyl compounds. Particularly suitable are tin(II) isooctoate and bismuth neodecanoate.

The catalysts are typically used in amounts of 0 to 2000 ppm, preferably 1 ppm to 1000 ppm, further preferably 2 ppm to 500 ppm and most preferably of 5 ppm to 300 ppm.

The properties of the thermoplastic polyurethanes of the invention may vary within wide ranges according to the application. The thermoplastic polyurethanes of the invention have, for example, a Shore hardness in the range from 60 A to 80 D, determined according to DIN 53505, preferably in the range from 80 A to 74 D, determined according to DIN 53505, further preferably in the range from 85A to 60D, determined according to DIN 53505, especially preferably in the range from 95 A to 58 D, determined according to DIN 53505.

In a further embodiment, the present invention relates to a thermoplastic polyurethane as described above, wherein the thermoplastic polyurethane has a Shore hardness in the range from 60 A to 80 D, determined according to DIN 53505.

In a further aspect, the present invention also relates to a process for preparing a thermoplastic polyurethane, comprising the conversion of components (i) to (iii):
(i) a polyisocyanate composition;
(ii) ethane-1,2-diol as chain extender;
(iii) a polyol composition,
wherein no further chain extender is used aside from ethane-1,2-diol.

The present invention also further relates to a process for preparing a thermoplastic polyurethane, comprising the conversion of components (i) to (iii):
(i) a polyisocyanate composition;
(ii) ethane-1,2-diol as chain extender;
(iii) a polyol composition,
wherein the polyol composition comprises at least polytetrahydrofuran (PTHF) and the polyisocyanate composition comprises at least methylene diphenyl diisocyanate (MDI) and wherein no further chain extender is used aside from ethane-1,2-diol.

With regard to preferred embodiments of the process, suitable feedstocks or mixing ratios, reference is made to the above remarks which apply correspondingly.

The conversion of components (i) to (iii) can in principle be conducted under reaction conditions known per se. The conversion can be effected batchwise or else continuously, for example in a belt process or a reactive extrusion process. Suitable processes are described, for example, in EP 0 922 552 A1 or WO 2006/082183 A1.

In a preferred embodiment, the conversion of components (i) to (iii) is conducted at elevated temperatures relative to room temperature.

According to the invention, the heating can be effected in any suitable manner known to those skilled in the art.

In the case of a conversion by means of reactive extrusion methods, for example, the reaction is conducted in such a way that the zone temperature is in the range from 170° C. to 245° C., preferably in the range from 180° C. to 235° C., further preferably in the range from 190° C. to 230° C.

Accordingly, the present invention, in a further embodiment, also relates to a process for preparing a thermoplastic polyurethane as described above, wherein the conversion is effected by means of a reactive extrusion process and the zone temperature is in the range from 170° C. to 245° C.

According to the invention, it is also possible that the process comprises further steps, for example a pretreatment of the components or an aftertreatment of the thermoplastic polyurethane obtained. Accordingly, the present invention also relates, in a further embodiment, to a process for preparing a thermoplastic polyurethane as described above, wherein the thermoplastic polyurethane obtained is heat-treated after the conversion.

The thermoplastic polyurethane of the invention or a thermoplastic polyurethane obtained or obtainable by a process according to the invention can be used in various ways. More particularly, the thermoplastic polyurethanes of the invention are suitable for the production of moldings and films, further preferably for the production of hoses.

The present invention therefore also further relates to the use of a thermoplastic polyurethane as described above or of a thermoplastic polyurethane obtainable or obtained by a process of the invention for production of injection molding products, extrusion products, films, and shaped bodies. In a further embodiment, the present invention relates to the use as described above, wherein the shaped body is a hose. The high burst pressure of the thermoplastic polyurethanes of the invention is advantageous here.

The present invention also relates to the injection molding products, extrusion products, films or shaped bodies obtained by a process of the invention, for example hoses, cable sheaths or conveyor belts.

It is also possible in the context of the present invention that the injection molding products, extrusion products, films or shaped bodies obtained are subjected to an aftertreatment.

The present invention further relates to a hose comprising a thermoplastic polyurethane as described above or a thermoplastic polyurethane obtainable or obtained by a process as described above.

This hose may have further constituents. More particularly, the hose may have multiple layers and be reinforced by means of standard measures. Suitable means of reinforcement are, for example, fibers or weaves, for example those composed of glass, textiles or metals.

In a further embodiment, the present invention accordingly relates to a hose as described above, wherein the hose has a multilayer structure.

In a further embodiment, the present invention accordingly relates to a hose as described above, wherein the hose has been reinforced by fibers or weaves.

In the context of the present invention, it is further possible that color pigments or liquid organic dyes are added in the course of production of a shaped body of the invention, especially of a film or hose.

It is further possible in the context of the present invention that the shaped body, for example the film or hose, is subjected to an aftertreatment, for example a crosslinking operation. In a further embodiment, the present invention accordingly relates to a film or hose as described above, wherein the film or hose has been subjected to an aftertreatment.

As the examples also demonstrate, it is possible to use a thermoplastic polyurethane of the invention to obtain a hose which is usable for pneumatic applications and has a burst pressure at 70° C. of greater than 20 bar after heat treatment at the dimensions of 5.8* 8.2 mm at a Shore hardness of 98 A.

Further preferred applications are as cable sheathing or else for the production of conveyor belts. The high heat distortion resistance of the thermoplastic polyurethanes of the invention is advantageous for the application as cable sheathing. In the context of the present invention, heat distortion resistance is determined by means of the TMA onset temperature.

Further embodiments of the present invention can be inferred from the claims and examples. It will be apparent that the aforementioned features of the subject matter/processes/uses of the invention and those that are elucidated hereinafter are usable not just in the particular combination specified but also in other combinations, without leaving the scope of the invention. For example, the combination of a preferred feature with a particularly preferred feature, or that of a feature that has not been characterized further with a particularly preferred feature, etc., is implicitly also encompassed even if this combination is not mentioned explicitly.

Illustrative embodiments of the present invention are listed hereinafter, although these do not restrict the present invention. More particularly, the present invention also encompasses those embodiments which arise from the dependency references and hence combinations cited hereinafter.

A thermoplastic polyurethane obtainable or obtained by conversion of at least components (i) to (iii):
   (i) a polyisocyanate composition;
   (ii) ethane-1,2-diol as chain extender;
   (iii) a polyol composition,
   wherein no further chain extender is used aside from ethane-1,2-diol.
2. The thermoplastic polyurethane according to embodiment 1, wherein the polyol composition used comprises at least one polyol selected from the group consisting of polytetrahydrofuran (PTHF), polyethylene glycol, polypropylene glycol, polyadipates, polycarbonate(diol)s and polycaprolactones.
3. The thermoplastic polyurethane according to embodiment 2, wherein the polytetrahydrofuran has a molecular weight Mn in the range from 650 g/mol to 1400 g/mol.
4. The thermoplastic polyurethane according to any of embodiments 1 to 3, wherein the polyisocyanate composition used comprises at least one polyisocyanate selected from the group consisting of methylene diphenyl diisocyanate (MDI), hexamethylene 1,6-diisocyanate (HDI) and 4,4'-, 2,4'- and 2,2'-methylene dicyclohexyl diisocyanate (H12MDI).
5. The thermoplastic polyurethane according to any of embodiments 1 to 4, wherein the molar ratio of the sum total of the functionalities of the polyol composition and chain extenders used to the sum total of the functionalities of the isocyanate composition used is in the range from 1:0.8 to 1:1.3.
6. The thermoplastic polyurethane according to any of embodiments 1 to 5, wherein the index in the conversion is in the range from 965 to 1100.
7. The thermoplastic polyurethane according to any of embodiments 1 to 6, wherein at least one polyol present in the polyol composition has a molecular weight Mn in the range from 500 g/mol to 1500 g/mol.
8. The thermoplastic polyurethane according to any of embodiments 1 to 7, wherein the thermoplastic polyurethane has a Shore hardness in the range from 60 A to 80 D, determined according to DIN 53505.
9. A process for preparing a thermoplastic polyurethane, comprising the conversion of components (i) to (iii):
   (i) a polyisocyanate composition;
   (ii) ethane-1,2-diol as chain extender;
   (iii) a polyol composition,
   wherein no further chain extender is used aside from ethane-1,2-diol.
10. The use of a thermoplastic polyurethane according to any of embodiments 1 to 8 or of a thermoplastic polyurethane obtainable or obtained by a process according to embodiment 9 for production of injection molding products, extrusion products, films and shaped bodies.
11. The use according to embodiment 10, wherein the shaped body is a hose.
12. A hose comprising a thermoplastic polyurethane according to any of embodiments 1 to 8 or a thermoplastic polyurethane obtainable or obtained by a process according to embodiment 9.
13. A thermoplastic polyurethane obtainable or obtained by conversion of at least components (i) to (iii):
   (i) a polyisocyanate composition;
   (ii) ethane-1,2-diol as chain extender;
   (iii) a polyol composition,
   wherein no further chain extender is used aside from ethane-1,2-diol.
   wherein the polyol composition comprises at least polytetrahydrofuran (PTHF) and the polyisocyanate composition comprises at least methylene diphenyl diisocyanate (MDI).
14. The thermoplastic polyurethane according to embodiment 13, wherein the polytetrahydrofuran has a molecular weight Mn in the range from 650 g/mol to 1400 g/mol.
15. The thermoplastic polyurethane according to either of embodiments 13 and 14, wherein the molar ratio of the sum total of the functionalities of the polyol composition and chain extenders used to the sum total of the functionalities of the isocyanate composition used is in the range from 1:0.8 to 1:1.3.
16. The thermoplastic polyurethane according to any of embodiments 13 to 15, wherein the characteristic in the conversion is in the range from 965 to 1100.
17. The thermoplastic polyurethane according to any of embodiments 13 to 16, wherein the thermoplastic polyurethane has a Shore hardness in the range from 60 A to 80 D, determined according to DIN 53505.
18. A process for preparing a thermoplastic polyurethane, comprising the conversion of components (i) to (iii):
   (i) a polyisocyanate composition;
   (ii) ethane-1,2-diol as chain extender;
   (iii) a polyol composition, wherein no further chain extender is used aside from ethane-1,2-diol, wherein the polyol composition comprises at least polytetrahydrofuran (PTHF) and the polyisocyanate composition comprises at least methylene diphenyl diisocyanate (MDI).

19. The use of a thermoplastic polyurethane according to any of embodiments 13 to 17 or a thermoplastic polyurethane obtainable or obtained by a process according to embodiment 18 for production of injection molded products, extrusion products, films and shaped bodies.

20. The use according to embodiment 19, wherein the shaped body is a hose.

21. A hose comprising a thermoplastic polyurethane according to any of embodiments 13 to 17 or a thermoplastic polyurethane obtainable or obtained by a process according to embodiment 18.

The examples which follow serve to illustrate the invention, but are in no way restrictive with regard to the subject matter of the present invention.

EXAMPLES

Preparation Example I

The following feedstocks were used:

Polyol 1: polyether polyol having an OH number of 174.7 and exclusively primary OH groups (based on tetramethylene oxide, functionality: 2)

Polyol 2: polyether polyol having an OH number of 112.2 and exclusively primary OH groups (based on tetramethylene oxide, functionality: 2)

Polyol 3: mixture of polyol 2 53.33% and polyol 4 46.67%

Polyol 4: polyether polyol having an OH number of 55.8 and exclusively primary OH groups (based on tetramethylene oxide, functionality: 2)

Polyol 5: polyester polyol having an OH number of 140 and exclusively primary OH groups (based on adipic acid and butanediol, functionality: 2)

Isocyanate 1: aromatic isocyanate (4,4' methylene diphenyl diisocyanate)

CE 1: ethane-1,2-diol

CE2: butane-1,4-diol

Catalyst 1: tin(II) isooctoate (10% in dioctyl adipate)

1.1 Example of Batchwise Synthesis

A thermoplastic polyurethane (TPU) was synthesized from diphenylmethane 4,4'-diisocyanate, ethane-1,2-diol chain extender and polytetrahydrofuran having a number-average molar mass of 1 kg/mol, with stirring in a reaction vessel. The start temperature was 80° C. On attainment of a reaction temperature of 110° C., the solution was poured onto a hotplate heated to 125° C., and the TPU sheet obtained was pelletized after the heat treatment (15 h, 80° C.). The measured values were established using injection molded sheets or hoses, with the zone temperatures of the extruders used between 190° C. and 235° C.

The synthesis and properties of thermoplastic polyurethanes obtained are compiled in tables 1 and 2.

TABLE 1

Examples of synthesis:

|  | Example 1 | Example 2 | Example 3 | Example 4 |
|---|---|---|---|---|
| Hard segment content [%] | 40 | 38 | 40 | 42 |
| OH number | 147.7 | 116.3 | 114.8 | 113.6 |
| Polyol 1 [g] | 1000 | | | |
| Polyol 2 [g] | | 1000 | | 750 |
| Polyol 3 [g] | | | 1000 | |
| Isocyanate 1 [g] | 1131.87 | 877.82 | 797.16 | 690 |
| CE 1 [g] | 184.11 | 153.40 | 155.2 | |
| CE 2 [g] | | | | 180.1 |
| Index | 1000 | 1010 | 1000 | 1000 |

TABLE 2

Examples of properties:

|  | Example 1 | Example 2 | Example 3 | Example 4 |
|---|---|---|---|---|
| Shore D | 59 | 47 | 47 | 56 |
| Modulus of elasticity [MPa] | 90 | 69 | 50 | |
| Tensile strength [MPa] | 39 | 27 | 22 | 53 |
| Elongation at break [%] | 420 | 570 | 510 | 420 |
| Tear propagation resistance [kN/m] | 135 | 72 | 67 | 113 |
| Compression set (72 h/23° C./30 min) [%] | 37 | 33 | 27 | 21 |
| Compression set (24 h/70° C./30 min) [%] | 55 | 51 | 47 | 35 |
| Compression set (24 h/100° C./30 min) [%] | 75 | 73 | 67 | 54 |
| Abrasion [mm$^3$] | 94 | 140 | 127 | 36 |
| Burst pressure of non-heat-treated 5.8 * 8.2 mm hoses at 23° C. [bar] | 51.5 | 33.7 | 33.8 | 22.4 |
| Burst pressure of non-heat-treated 5.8 * 8.2 mm hoses at 70° C. [bar] | 22.8 | 20.2 | 21.9 | 12.1 |
| Burst pressure of heat-treated 5.8 * 8.2 mm hoses at 23° C. [bar] | 53.5 | 35.1 | 36.7 | 27.5 |
| Burst pressure of heat-treated 5.8 * 8.2 mm hoses at 70° C. [bar] | 28.2 | 24.1 | 25.6 | 14.7 |
| Creep characteristics [%] | 11.41 | | 4.64 | |
| Vicat determination (10N, 120° C./h) [°C.] | 140.3 | | 111.8 | |
| TMA onset temperature (ΔT20° C./min) [°C.] | 195 | 200 | 233 | 177 |
| Hose appearance | translucent | translucent | opaque | transparent |

1.2 Example of Continuous Synthesis

1.2.1 Reactive Extrusion Method

The first housing of a ZSK 92 twin-shaft extruder from Werner & Pfleiderer, Stuttgart, having a process length of 56 D, was charged with a mixture of the ethane-1,2-diol chain extender, polytetrahydrofuran and a catalyst with a charge temperature of 150° C. and, separately therefrom, the diphenylmethane 4,4'-diisocyanate was metered into the first housing at a charge temperature of 65° C., and optionally a phenolic antioxidant. The speed of the twin screw was 280 min$^{-1}$. The set temperature values for the housing were, in flow direction, 200° C. in the first third of the screw, 170° C. in the second third of the screw, and 190° C. in the last third of the screw. The expulsion rate was 850 kg/h. After the melt chopping by underwater pelletization and integrated centrifugal drying, the pellets were subjected to final drying at about 80 to 90° C.

The pellets were subsequently processed further by injection molding to give test specimens or by extrusion to give hoses. The hoses were run by extrusion in an Arenz 45 mm extruder with a 3-zone screw with a 9.8 mm die and a 6.9 mm mandrel. The zone temperatures were between 180 and 225° C. The hose geometry was adjusted by varying the draw-off speed and pressure in the water bath with vacuum calibration.

The synthesis and properties of thermoplastic polyurethanes which have been prepared by continuous synthesis are compiled in table 3 and table 4.

TABLE 3

Examples of synthesis:

| | Example 5 | Example 6 | Example 7 |
|---|---|---|---|
| Hard segment content [%] | 40 | 40 | 35 |
| OH number | 112.3 | 112.3 | 140 |
| Polyol 2 [g] | 1000 | 1000 | |
| Polyol 5 [g] | | | 1000 |
| Isocyanate 1 [g] | 904.37 | 918.39 | 878.36 |
| CE 1 [g] | 164.46 | 165.67 | 140.42 |
| Catalyst 1 [ppm] | 7.5 | 7.5 | 20 |
| Index | 990 | 1000 | 1000 |

TABLE 4

Examples of properties:

| | Example 5 | Example 6 | Example 7 |
|---|---|---|---|
| Shore D | 53 | 55 | 50 |
| Modulus of elasticity [MPa] | 75 | 72 | 32 |
| Tensile strength [MPa] | 25 | 32 | 30 |
| Elongation at break [%] | 520 | 500 | 450 |
| Tear propagation resistance [kN/m] | 84 | 102 | 88 |
| Compression set (72 h/23° C./30 min) [%] | 30 | 31 | 38 |
| Compression set (24 h/70° C./30 min) [%] | 50 | 55 | 64 |
| Compression set (24 h/100° C./30 min) [%] | 71 | 69 | 100 |
| Abrasion [mm$^3$] | 138 | 80 | 79 |
| Burst pressure of non-heat-treated 5.8 * 8.2 mm hoses at 23° C. [bar] | 30.5 | 30.9 | 36.9 |
| Burst pressure of non-heat-treated 5.8 * 8.2 mm hoses at 70° C. [bar] | 19.7 | 19.6 | 17.6 |
| Burst pressure of heat-treated 5.8 * 8.2 mm hoses at 23° C. [bar] | 31.1 | 32.3 | 40 |
| Burst pressure of heat-treated 5.8 * 8.2 mm hoses at 70° C. [bar] | 22.3 | 22.6 | 19.2 |
| Creep characteristics % | 5.79 | 5.35 | |
| Vicat determination (10N, 120° C./h) [°C.] | 145.8 | 155.8 | |
| TMA onset temperature (ΔT 20° C./min) [°C.] | 209 | 211 | |
| Hose appearance | translucent | translucent | opaque |

4. Test Methods

For the material characterization, it is possible to use test methods including the following: DSC, DMA, TMA, NMR, FT-IR, GPC, burst pressure measurement

| | |
|---|---|
| Shore D hardness | DIN 7619-1, |
| Tensile strength | DIN 53504, |
| Elongation at break | DIN 53504, |
| Tear propagation resistance | DIN 53515, |
| Abrasion | DIN 4649 |
| Vicat | DIN EN ISO 306 |
| Compression set | DIN ISO 815 |
| Creep characteristics | DIN EN ISO 899-1 |
| Modulus of elasticity | DIN 53504 (S1 tensile specimen) |

The creep characteristics were determined by elongating a heat-treated (20 h/100° C.) S1 tensile specimen by 5%. The force/tension that occurs at first at this elongation is maintained at room temperature for 12 hours. After relaxation, the difference in length is determined.

The invention claimed is:

1. A thermoplastic polyurethane obtained by conversion of at least components (i) to (iii):
   (i) a polyisocyanate composition comprising methylene diphenyl diisocyanate (MDI);
   (ii) ethane-1,2-diol as chain extender; and
   (iii) a polyol composition comprising two or more polyols at least comprising polytetrahydrofuran (PTHF) and a further polyol selected from polyethers, polyesters, block copolymers and hybrid polyols,
   wherein no further chain extender is present aside from the ethane-1,2-diol,
   wherein the polyol used has a molecular weight Mn ranging from 500 g/mol to 1500 g/mol, and
   wherein a molar ratio of sum total of functionalities of the polyol composition and the chain extender to sum total of functionalities of the polyisocyanate composition ranges from 1:08 to 1:1.3.

2. The thermoplastic polyurethane according to claim 1, wherein said further polyol is at least one polyether selected from the group consisting of a polyethylene glycol and a polypropylene glycol.

3. The thermoplastic polyurethane according to claim 1, wherein the polyol composition comprises a polytetrahydrofuran having a molecular weight Mn ranging from 650 g/mol to 1400 g/mol.

4. The thermoplastic polyurethane according to claim 1, wherein the polyisocyanate composition further comprises at least one polyisocyanate selected from the group consisting of hexamethylene 1,6-diisocyanate (HDI), 4,4'-methylene dicyclohexyl diisocyante, 2,4'-methylene dicyclohexyl diisocyanate and 2,2'-methylene dicyclohexyl diisocyanate (H12MDI).

5. The thermoplastic polyurethane according to claim 1, wherein said further polyol is at least one polyester selected from the group consisting of a polyadipate and a polycaprolactone.

6. The thermoplastic polyurethane according to claim 1, wherein an isocyanate index in the conversion ranges from 965 to 1100.

7. The thermoplastic polyurethane according to claim 1, wherein the thermoplastic polyurethane has a Shore hardness ranging from 60 A to 80 D, determined according to DIN 53505.

8. A process for preparing a thermoplastic polyurethane, the process comprising converting components (i) to (iii)
   (i) a polyisocyanate composition comprising methylene diphenyl diisocyanate (MDI);
   (ii) ethane-1,2-diol as chain extender; and
   (iii) a polyol composition comprising two or more polyols at least comprising polytetrahydrofuran (PTHF) and a further polyol selected from polyethers, polyesters, block copolymers and hybrid polyols, wherein no further chain extender is present aside from the ethane-1,2-diol, wherein the polyol used has a molecular weight Mn ranging from 500 g/mol to 1500 g/mol, and wherein a molar ratio of sum total of functionalities of the polyol composition and the chain extender to sum total of functionalities of the polyisocyanate composition ranges from 1:0.8 to 1:1.3.

9. A product formed from the thermoplastic polyurethane of claim 1, the product being selected from the group consisting of a molded product, an extrusion product, a film and a shaped body.

10. The product according to claim 9, which is a shaped body in the form of a hose.

11. A hose, comprising the thermoplastic polyurethane according to claim 1.

12. The thermoplastic polyurethane according to claim 1, wherein the polyisocyanate composition further comprises at least one aromatic diisocyanate.

13. The thermoplastic polyurethane according to claim 1, wherein:

the polyisocyanate composition further comprises an aromatic diisocyanate selected from the group consisting of naphthylene 1,5-diisocyanate (NDI), tolylene 2,4-diisocyanate, 2,6-diisocyanate, 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and phenylene diisocyanate.

14. The thermoplastic polyurethane according to claim 1, wherein the polyisocyanate composition consists of methylene diphenyl diisocyanate (MDI).

15. The process according to claim 8, wherein:

the polyisocyanate composition further comprises an aromatic diisocyanate selected from the group consisting of naphthylene 1,5-diisocyanate (NDI), tolylene 2,4-diisocyanate, 2,6-diisocyanate, 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and phenylene diisocyanate.

16. The thermoplastic polyurethane according to claim 1, wherein said further polyol is polyester polyol which is a polycarbonate (diol).

\* \* \* \* \*